Jan. 7, 1964 W. K. KINKEAD 3,117,291
MULTICHANNEL WAVE SIGNAL ROTARY JOINT
Filed Jan. 24, 1962 6 Sheets-Sheet 1

INVENTOR.
WILSON K. KINKEAD
BY
OSTROLENK, FABER, GERB & SOFFEN
ATTORNEYS

Jan. 7, 1964 W. K. KINKEAD 3,117,291
MULTICHANNEL WAVE SIGNAL ROTARY JOINT
Filed Jan. 24, 1962 6 Sheets-Sheet 3

FIG. 7.

INVENTOR.
WILSON K. KINKEAD
BY
OSTROLENK, FABER, GERB & SOFFEN,
ATTORNEYS

Jan. 7, 1964 W. K. KINKEAD 3,117,291
MULTICHANNEL WAVE SIGNAL ROTARY JOINT
Filed Jan. 24, 1962 6 Sheets-Sheet 4

INVENTOR.
WILSON K. KINKEAD
BY
OSTROLENK, FABER, GERB & SOFFEN
ATTORNEYS

Jan. 7, 1964

W. K. KINKEAD 3,117,291

MULTICHANNEL WAVE SIGNAL ROTARY JOINT

Filed Jan. 24, 1962

INVENTOR
WILSON K. KINKEAD

By
OSTROLENK, FABER, GERB & SOFFEN
ATTORNEYS

Jan. 7, 1964 W. K. KINKEAD 3,117,291
MULTICHANNEL WAVE SIGNAL ROTARY JOINT
Filed Jan. 24, 1962 6 Sheets-Sheet 6

INVENTOR.
WILSON K. KINKEAD
BY
OSTROLENK, FABER, GERB & SOFFEN
ATTORNEYS

United States Patent Office 3,117,291
Patented Jan. 7, 1964

3,117,291
MULTICHANNEL WAVE SIGNAL ROTARY JOINT
Wilson K. Kinkead, Newtown Square, Pa., assignor to I-T-E. Circuit Breaker Company, Philadelphia, Pa., a corporation of Pennsylvania
Filed Jan. 24, 1962, Ser. No. 168,471
13 Claims. (Cl. 333—1)

My invention relates to a novel wave signal rotary joint or coupler that is capable of efficient transmission of microwave signals between ports that are continuously rotating with respect to each other.

In a great variety of microwave systems the need often exists to efficiently couple energy between a stationary member and a rotating member. A typical example is the continuous scan antenna drive frequently employed in radar, radio telescopy or communications systems. Inasmuch as such antennas continuously rotate a great number of turns about a 360° sector, the energy cannot be directly coupled thereto by means of unitary cables or wave guides. Hence, a rotating joint which permits such complete rotation while satisfying all of the electrical and mechanical requirements of the system must be devised.

Numerous arrangements are presently known in the prior art. However, none of these heretofore known arrangements show the advantageous capabilities of the instant invention in meeting difficult combinations of performance requirements. Such requirements typically include: simultaneously coupling three or more signal channels without interference; handling high average and peak signal power in each channel; low signal attenuation; broad-band operation while maintaining the properties of the translated signal; low ratio of the amplitude of the reflected and incident transmitted waves (or SWR), and low variation in transmission characteristics as the joint is rotated about its axis or wow. It is also desired that a practicable rotary joint be of a convenient size and construction permitting it to be incorporated about available axial structures, such as the radar mast or torque tubes.

Many combinations of the above noted performance requirements presented by typical microwave systems may be met by the rotary joint described in copending U.S. application Serial Number 56,496, filed September 16, 1960, entitled "Wave Signal Rotary Joint," in the name of David E. Bowman and assigned to the assignee of the instant invention. The rotary joint of the instant invention is an improvement over that described in the above-noted copending U.S. application and possesses certain preferred electrical and mechanical characteristics over that rotary joint.

The rotary joint of the instant application and that of the above noted copending U.S. application Serial No. 56,496, are based on the same principle of operation. That is, both joints contain a central rotary transmission section between upper and lower end launcher sections. The end launcher sections are in respective relative angular motion about a central axis. The central transmission section contains a number of waveguide paths to conduct the wave signals of a plurality of separate channels introduced at one of its ends by one of the launchers to its other end where it is introduced to the other end launcher. Each of the individual wave guide paths of the central transmission sections are in transposed end to end space phase relationship. That is, if the waveguide path openings at the transmitting launcher end are arrayed in a clockwise direction, the correlative path ends at the receiving launcher ends will be arrayed in a clockwise direction. As shown in the above noted copending U.S. application Serial No. 56,496, rotation of the central transmitting sections with respect to the end launcher sections will effect the desired multi-channel transmission between the end launcher sections, one of which may be stationary and the other movable.

In the embodiments previously illustrated the individual transposed waveguide paths are generally located towards the peripheral region of the central transmission section. A serious disadvantage of this arrangement is that such generally peripheral paths do not define the minimum path lengths between the transposed path ends.

The basis of the improvement of the instant invention is to minimize the lengths of these transposed paths by having them take the more direct route through the inner region of the central transmission section. Many advantageous electrical results flow from this structural change. In particular, by minimizing such path lengths the attenuation resulting from transmission through the rotary joint is appreciably reduced, the wow of the joint is significantly reduced, and band width is appreciably increased.

The improvement in band width and wow stem simultaneously from the reduced effect of ring-mode resonances. Such resonances exist in transmission systems which have two similar and parallel wave paths. In such a structure there will exist an uncoupled mode that becomes resonant when the path length down one wave path and back the other becomes an integral number of wave lengths. Although, in theory the mode is uncoupled, in practice it is not possible to avoid coupling to it. Near the resonant frequency the system is disturbed by the coupled component of impedance. It has been observed that such ring resonances become spread out with respect to frequency as the path lengths are shortened. Since such ring resonances around the drum path give rise to high mismatch and variation of transmission with rotation, their spreading out in frequency will have the simultaneous effect of reducing wow and increasing band width.

In devising a practical configuration to achieve the theoretical goal of minimum path lengths, design consideration must be given to maintaining equal electrical length of the paths and compensating for the finite thickness of the waveguides. In the illustrated embodiment of my invention such a particularly advantageous nested arrangement of waveguides is shown. Each of the guides contain a generally S-shape central region lying in respectively parallel planes. These planes are each parallel to a principal diameter of the central transmission section and extend in a direction generally across the central section. The openings of the nested guides satisfy the transposed relationship about respective annular regions of central transmission end sections and the paths take appropriate routes to equalize the electrical length.

In minimizing the path lengths, the overall dimensions of the central transmission units are reduced, resulting in a compact low inertia form of minimum size and weight.

It is accordingly a primary object of the present invention to provide an improved wave signal rotary joint with plural channel capabilities.

Another object of the present invention is to provide a wave signal rotary joint or coupler composed of three relatively rotatable aligned sections through which the signals are projected with minimum attenuation.

A further object of the present invention is to provide an improved wave signal rotary joint having a central transmission section containing a nested array of paths extending generally across that section and in transposed end-to-end relationship.

Still another object of this invention is to provide an improved rotary joint of multi-channel capability, low signal attenuation, low wow and broad-band width.

Still a further object of the present invention is to provide an improved wave signal rotary joint having a central transmission section containing a number of individual transposed end-to-end wave signal paths passing through its inner region.

Yet another object of the present invention is to provide an improved wave signal rotary joint of minimum size and weight and of compact low inertia form.

Yet a further object of the present invention is to provide an improved wave signal rotary joint having a central section of minimum size and weight and containing a nested array of generally S-shaped minimum length paths.

These as well as other objects of the instant invention will readily become apparent after reading the following description of the accompanying drawings in which.

Figures 1, 2, 3:
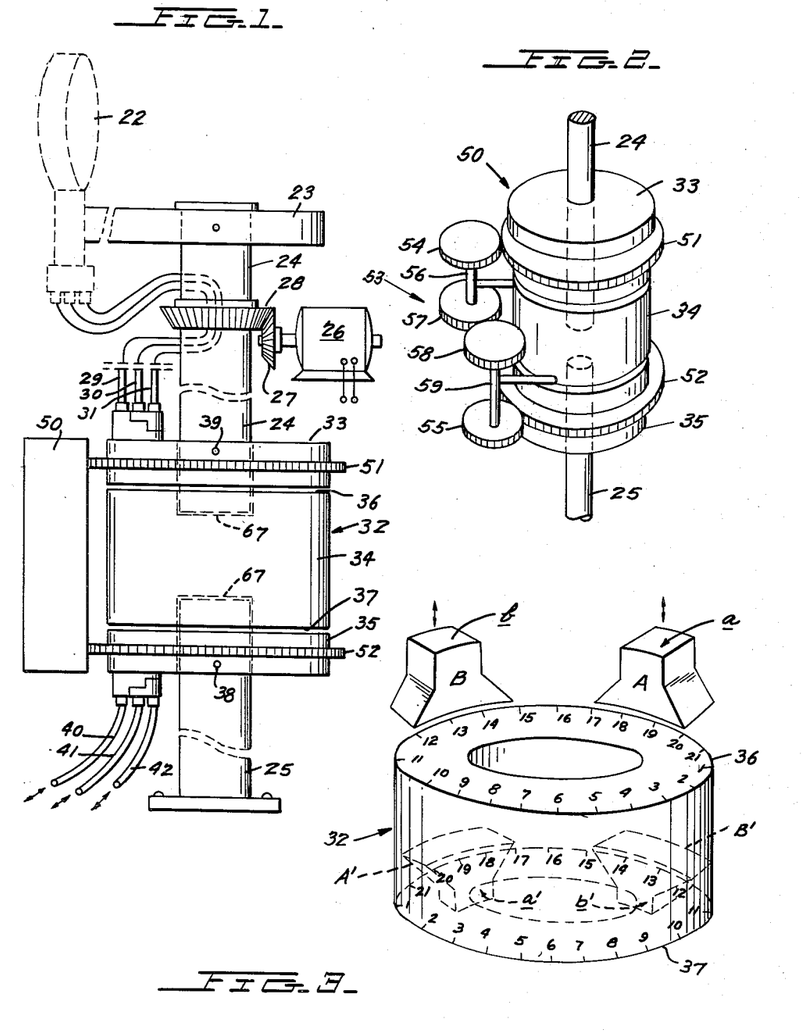
FIGURE 1 is a schematic showing a radar system incorporating a multi-channel wave signal rotary joint in accordance with the instant invention.
FIGURE 2 is a simplified perspective illustration of the rotary joint construction showing a form for its rotary drive.
FIGURE 3 is a simplified diagrammatic perspective representation of the wave signal rotary coupler.

Referring to FIGURE 1, the radar system is illustrated utilizing three wave signal channels. The radar antenna 22 extends from frame 23 and is rotated by the central shaft or mast 24 through drive motor 26 and gearing 27 and 28. The radar antenna 22 is shown connected with three signal waveguides or cables 29, 30 and 31, which, of course, may be two, four or more guides depending on the particular system requirements. The multi-channel cables 29, 30 and 31 are affixed to the rotatable upper structure being rotated with the antenna 22 on mast 24. The cables 29, 30 and 31 terminate in the upper launching section 33 of the rotary joint 32. The cable may be passed through the inside of gear 28 as illustrated so they will not be cut off by the motor mounting.

The rotary joint 32 is shown in block form as mounted concentrically about the mast 24—25; being in generally cylindrical form. The physical rotary joint 32 may assume many forms and embodiments. However, such various forms and embodiments basically correspond in system arrangement with the diagrammatic representation 32 in FIGURE 1. The wave signal rotary joint 32 is composed of two end launcher sections 33 and 35 each operatively related with an end region 36, 37 of central section 34. The central section 34 and one end launcher section 33 are rotated at a differential rate, with the other end launcher section being preferably (though not necessarily) stationary.

Concentrating on the embodiments where lower end launcher section 35 is stationary, that section is secured at 38 to stationary mast section 25. Upper launcher section 33 is secured at 30 to rotatable mast 24 and rotates therewith. Thus, section 33 will be rotated by motor 26 together with antenna 22 and multi-channel cables 29, 30 and 31.

The central section 34 is rotatably associated with upper launching section 33 by the planetary differential gearing assembly schematically illustrated as 50. In the aforementioned copending U.S. application Serial No. 56,496, the individual central section wave paths are shown in the outer region of that cylinder, leaving a hollowed central region which can contain the requisite differential gearing. The illustrated embodiment of the instant invention shows the individual waveguide paths of the central section 34 as occupying the inner region of that section. It is, therefore, convenient to locate the differential gearing external to central section 34. The interior of launching sections 33 and 35 are shown hollowed sufficiently to be readily fitted about drive shaft or mast sections 24, 25′. Centrally located apertures 34 in central section 34 are provided to receive the end projections of mast 24 and 25, respectively, thereby maintaining members 33, 34 and 35 in coaxial alignment. However, while the waveguide paths do occupy the inner region they need not necessarily occupy it to the exclusion of a mast, shaft or smaller rotary joint which may pass through concentrically. The guides in the innermost region of the central section could be rerouted slightly away from that region to prevent passage of such an axial member.

Relative rotation of the rotary joint sections 33, 34 and 35 are requisite in carrying out the principles of the present invention as will be set forth. Such rotation may be effected by numerous gearing arrangements an example of which is illustrated in FIGURE 2. Upper launcher section 33, secured to rotating mast 24, contains external gear 51 rigidly secured about its peripheral surface. Lower launcher section 34, rigidly secured to stationary mast 25, contains external gear 52′, rigidly secured about its peripheral surface. Planetary gear assembly 50 contains gear 54 which engages upper launcher section gear 51, and gear 55 which engages lower launching section gear 52. The ratios between gears 51—54 and 52—55 are equal.

Gear 54 rotates about shaft 56, fixedly secured to its center. Shaft 46 is maintained parallel to the axis of revolution of rotating members 33, 34 and 35 and is rigidly secured to the external surface of central transmission section 34. The lower end of shaft 56 contains gear 57 fixedly mounted at its center. Gear 57 engages gear 58 and is in a one-to-one ratio therewith. Gear 58 is fixedly secured to shaft 59 at its center. Shaft 59 is likewise parallel to the axis of rotation of members 33, 34 and 35 and rigidly secured to the outside surface of central transmission section 34. The lower end of shaft 59 contains gear 55 fixedly secured thereto. Gear 55 engages launching section gear 52. To illustrate the operation of this, gear arrangements assume clockwise rotation of shaft 24 at an angular speed of $r_1$. This will cause launcher section 33 and peripheral gear 51 to rotate in a clockwise direction at the same speed, $r_1$. The engagement of gears 51 and 54 will cause gears 54 and gear 57 to rotate in a counterclockwise rotation at a speed $r_2$, depending on the ratio of gears 51—54. The engagement of gears 57 and 58 will effect clockwise rotation of gears 58 and 55 at the same speed $r_2$. Inasmuch as gear 55 engages stationary gear 52, this rotational engagement may only be transmitted by clockwise planetary movement of the gear 55 about gear 52. This will effect planetary movement of assembly 53 (containing gears 54, 57, 58, 55 and shafts 56, 59) clockwise about the axis of rotation of rotary joint 32. The rigid connection of shafts 56 and 59 to central section 34 will effect clockwise rotation of that member 34. By virtue of the gearing ratios employed, central section 34 will rotate in a clockwise direction at the rotational speed of $r_{1/2}$. Thus, it is seen that gearing arrangement 50 provides differential rotation with launcher section 35 stationary and central section 34 rotating in the same direction as section 33 but at one-half its speed.

With the lower end section 35 held stationary the plurality of waveguide or cables thereto are readily integrated as shown in FIGURE 1 as 40, 41 and 42. The individual wave signals are introduced to or conducted from these cables which are connected to transmitting or receiving equipment at a remote location. The wave signal channels are simultaneously conducted through the guides 40, 41, 42 to the lower stationary launcher section 35. The multi-channel signals are then related to the adjacent central rotating transmission section 34 in an end-to-end relation. The multi-channel signals will then pass through central section 34 in the manner fully set forth below, and emerge at its upper end. Cables 29, 30, 31 and 40, 41, 42 are connected to individual launchers angularly disposed about respective end launcher sections 33 and 35.

A significant feature of this invention is its ability to translate a plurality of individual channel signals on a rotational basis with differential speeds of the joint (32), sections (33, 34 and 35) while maintaining synchronization and channel isolation. The basic advantages hereof accrue from the generic arrangement of either a single or multi-channel array of end launchers with an intermediate differentially motivated translator section, to effect an efficient, clean transition across a mechanical rotary configuration. The particular improvements of the instant invention result from the minimization of the signal path lengths in the translator section.

The basic principle of operation is that described in the above noted copending U. S. application Serial No. 56,496 and is discussed herein with reference to FIGURES 3 through 6. Referring first to FIGURE 2 which illustrates the general rotary joint 32 in a diagrammatic perspective view, the top or upper section launching section 26 has a series of launching devices, A, B . . . one for each channel desired. The devices A, B . . . are shown as horns but may be of other types, as discussed below. The respective launching devices A, B, are each arranged to couple from the top port $a, b$ . . . to a corresponding portion of the top end 36 of central transmission section 34. As explained in connection with FIGURE 1, the waveguide or cable connections extend from the ports $a, b$ . . . via cables 29, 30, etc., to the antenna rotated with top section 33.

The central transmission section 34 is differentially rotated with respect to launching sections 33 and 35 as set forth above. The central transmission section 34 conducts or directs the individual signal channels from one set of locations on its upper end region 36 to its other end region 37. The points 1, 2, 3 . . . and 1', 2', 3' . . . at opposite end regions of central transmission section 34 indicate the correlative ends of the individual signal paths contained therein. Significantly, however, the location of points 1', 2', 3', . . . 21' at the end 37, are not correspondingly longitudinally opposite the points 1, 2, 3 . . . 21 of region 36. The order of the numbered points of region 36 is in the opposite rotational direction to that of region 37 and in general physically displaced angularly. This opposite directional array of end points will be hereinafter conveniently referred to as a transposed space phase relationship. Such a transposed space phase relationship between the ends of the individual paths, coupled with the differential angular rotation of sections 33, 34 and 35 combine to provide the multi-channel isolated transmission of the instant invention.

The bottom launching section 35 has launching devices A', B', . . . located opposite the end region 37 of central section 34 about the arcuate area defined by the ends 1', 2', 3' . . . of that section's paths. Launchers A', B' . . . will always be at similarly numbered location points to their companion launchers A, B . . . . In this way, the isolated channels A—A', B—B' . . . are conducted across the rotary joints 32 through the central rotating transmission section 34. Chokes or contacts and/or other elements (not shown), may be provided to effect efficient coupling from the launching devices to the corresponding arcuate regions of the central transmission section 34, as will be apparent to those skilled in the art. The bottom ports $a', b'$ . . . of the horns A', B' . . . couple to corresponding waveguides which, in turn, connect to the electrical operating equipment.

In essence the wave signal rotary joint of the present invention provides a unique translation of wave signals (single or plural channels) between two launching sections that are movable (rotatable) with respect to each other, whereby uniform conduction (channel transmission) is effected of the wave signals between corresponding ports of the launching sections. As mentioned above, both the launching sections or the central translating drum may take various exemplary forms; a few of which are illustrated in the previously noted copending U. S. application Serial No. 56,496. All of the embodiments, however, shown in that patent application translate the individual paths of the central transmission section about the peripheral area of that section. Although such a configuration does result in certain advantages, as set forth therein, it does not permit a minimization of path lengths. The instant invention is directed to such a wave signal rotary joint in which the individual signal paths of central transmission sections are not confined to the peripheral region, and are thereby reduced in length.

Figure 4:
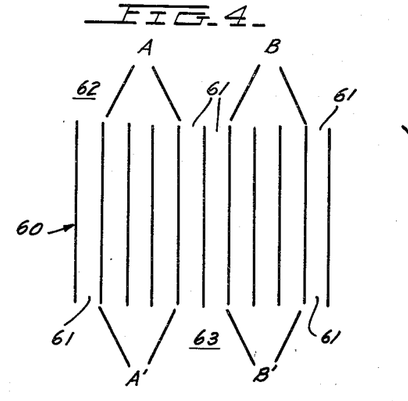
FIGURES 4 through 6 are generalized system diagrams of organ pipe arrays used in illustrating the principle of operation of the wave signal rotary coupler.
Figure 5:
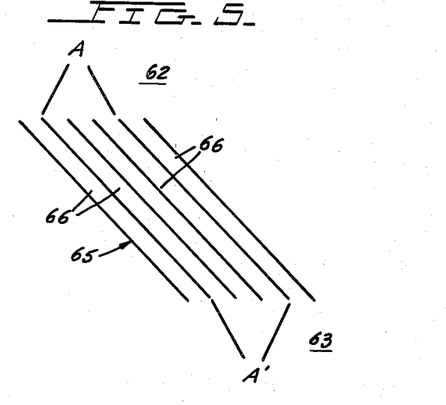
Figure 6:
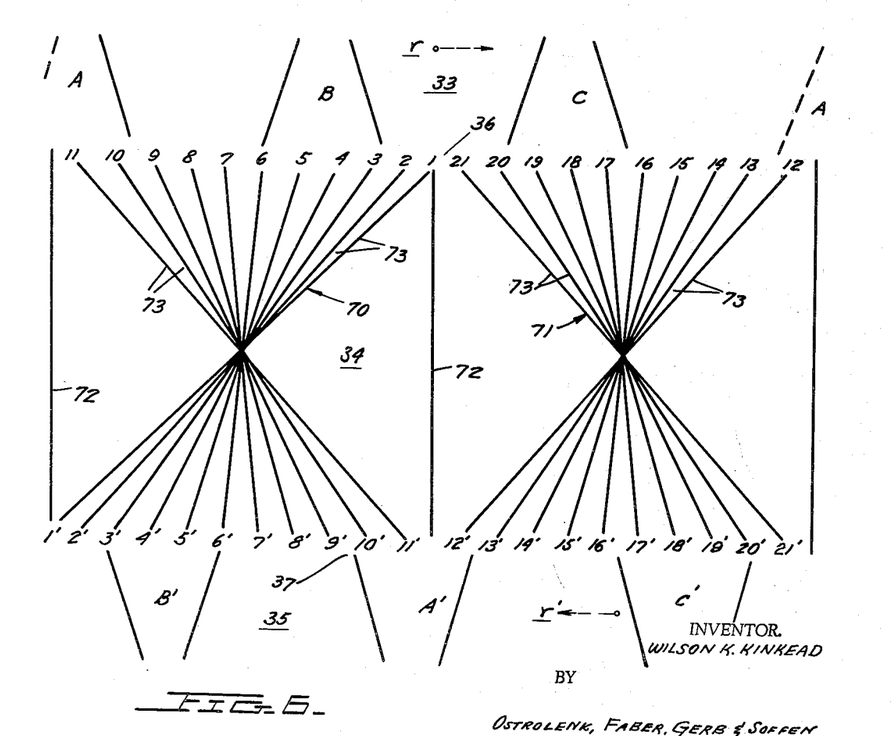

Reference is now made to FIGURES 4-6 for an explanation of the basic theoretical operation of the type of rotary joint of which the instant invention represents an improved embodiment. FIGURE 4 may be considered as a developed view of contiguous waveguide tubes 61, 61 which represent the individual paths of a central rotary joint transmission section 60. Although shown as single lines for purposes of clarity, it is naturally understood that each line corresponds to a hollowed guide. Preferably, guides 61, 61 are arrayed in the E-plane. The launcher sections shown here as 62, 63 contain feed horns A, B . . . and A', B' . . . . Each feed horn couples to a plurality of tubes 61 (four in this example). The feed horns are preferably of the E-plane sectoral form, firing into the open ends of the waveguides 61. As a rotary joint the developed tubes 61 would be rolled into a cylindrical form, roughly corresponding to 34 of FIGURES 1 through 3. Likewise, launcher sections 62, 63 roughly correspond to 33, 35 of these previously discussed figures.

The wave signal channels exist as A—A', B—B' . . . between the launching sections 62, 63. With the launching sections 62, 63 held stationary, or moved in synchronism, the illustrated in-phase, horn-to-horn position of the channels are held intact, and their transmission across the waveguide 61 is unaffected. Similarly, if the central section 60 is rotated or moved across the stationary launcher sections 62, 63 the channel transmission is still unaffected. A similar condition prevails when the waveguides 66, 66 are inclined, as in the drum 65 of FIGURE 5. However, to maintain channel integrity, it is necessary to position or phase the respective channel horns A—A' (etc.) at corresponding waveguide (66) endings. Neither system 60 or 65 will provide channel integrity with relative movement or rotation between the upper and lower horns or launcher sections 62, 63 as required in typical rotary joint application.

A significant feature of the present invention is to provide a unique rotating drum configuration that transmits the wave signals between two spaced launcher sections that are in relative rotation, and maintains the channel integrity between the launcher sections. In addition, such transmission is obtained over a broad band with low SWR, low wow, low signal attenuation and minimum degradation of signal characteristics. The developed view of FIGURE 6 is a diagrammatic representation of the basic method for accomplishing such channel transmission. FIGURES 8 through 13, which will be subsequently discussed, illustrate a particular embodiment of the instant invention which is based on this general theory of operation.

The development of central cylinder 34 of FIGURE 6 shows two identical nested arrays of crossed waveguide sections 70, 71 each approximating 180° of the cylindrical envelope of 34. Section 70 contains guides (73) numbered 2—2' through 11—11' and section 71 contains guides (73) numbered 12—12' through 21—21'. The approximately semi-cylindrical sections 70 and 71 are joined by guide 1—1' which extends across a principal diameter of the cylindrical section 34; the resultant structure being twenty-one guide openings evenly spaced about each of the ends 36, 37 of central transmission section 34. (It is noted that guide 1—1' appears in FIGURE 6 as being incorporated within section 70. This merely results from the method in which the development of that figure was obtained, as will be apparent from the ensuing discussion of FIGURES 7 and 8). The launcher sections 33, 35 are each shown containing three channel horn sets A—A', B—B' and C—C', set to fire sequentially into the open ends of the guides 73.

The guides 73 are sequenced in cylinder 34 with their ends grouping at opposite cylinder ends 36, 37 being in transposed space phase relationship, end-to-end thereof. The twenty-one guide ends cover the 360° circumference in this example, with more or less guides 73 being usable in a particular construction. The two individually nested sets 70, 71 permit a particularly advantageous practical construction of the instant invention.

Relative rotation between the launcher sections 33, 35 of FIGURE 6, as with section 33 moving in one direction r and the other sections 35 moving in direction r' opposite to r and of equal rate with respect to central section 34 results in unchanged channel transmission, between channel paths A—A', B—B', C—C'. The transposed space phase relationship of the ends of waveguide 73 results in the same relative clockwise or counterclockwise "viewing" by the respective launcher sections 33, 35.

The reverse angular sequencing of horn A', B', C' as illustrated, and the equal and opposite (angular) displacement rate of these horns A', B', C' with respect to the cylinder 34 as noted, results in identical relative transmission and channel integrity for the two rotating launcher sections 33, 35. Where it is desired to hold the launching sections, as for example the lower 135, stationary, then it is necessary only to rotate the central cylinder 34 at exactly one-half of the angular rate of rotation of the top launching section 33 to maintain channel integrity. Differential gearing 50 as per FIGURE 2 or equivalent means may be used to effect such relative rotation.

While the rotary joint system of FIGURE 6 uses three wave signal chnanels additional pairs of launching devices or horns may be added for additional channels. An upper limit on the number of channels is determined by the number of waveguides required per channel. In practice a sufficient number of guides should be engaged by each launching horn to provide acceptable commutation ripple and to provide adequate power handling capability. In addition the channels are preferably separated by a number of idle pipes to provide optimum signal isolation between the various channels.

In the particular embodiment chosen to illustrate the instant invention each launching horn engages four central section waveguides and each group of engaged waveguides is separated by three idle waveguides from its adjacent engaged groups.

Figure 7:
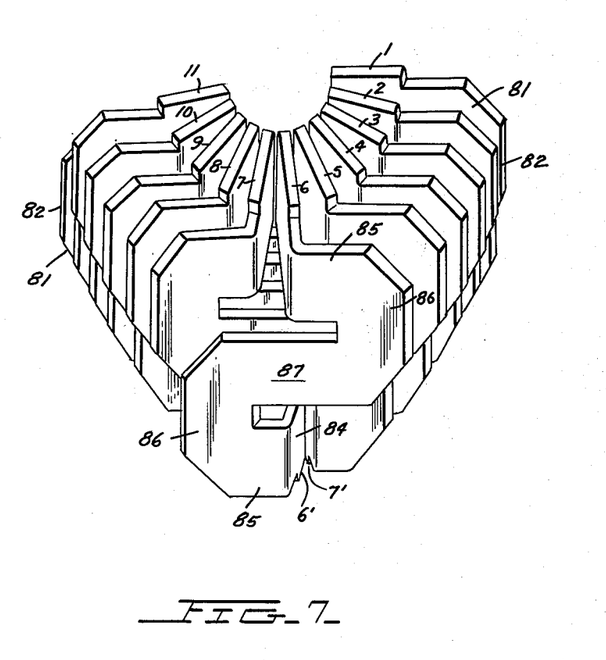
FIGURE 7 is a perspective view of a portion of the central transmission section of the instant invention.
Figure 8:
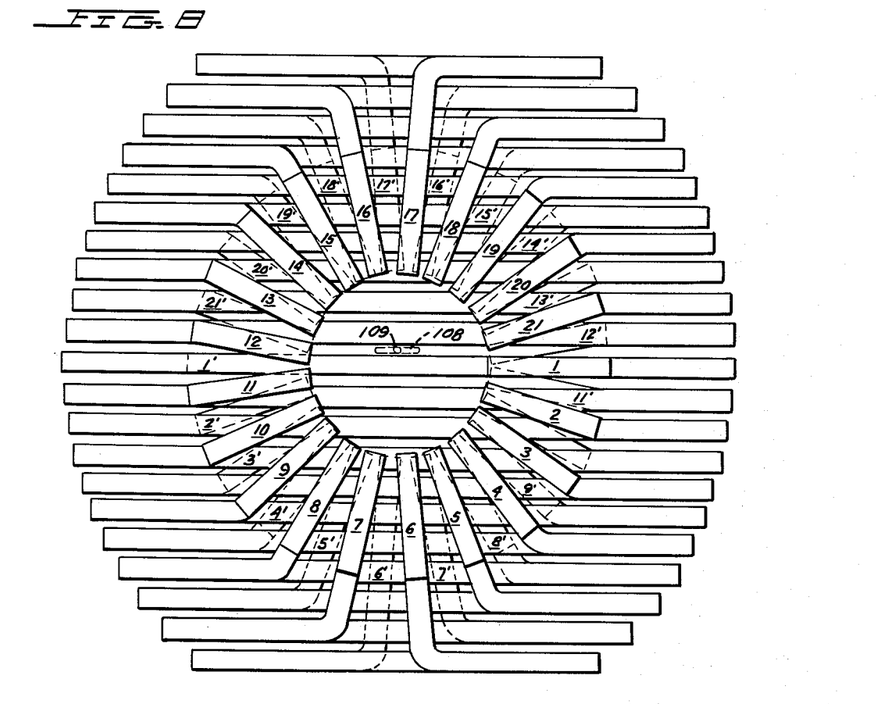
FIGURE 8 is a plan view of the central transmission section of the instant invention, showing the individual conductor path routes.

Referring to FIGURES 7 and 8, the twenty-one individual waveguide conductor paths (1—1', 2—2' ... 21—21') are in an adjacent nested arrangement circumferentially disposed about a central longitudinal axis. The assembled unit is seen to be a cylindrical structure in which the ends 1 through 21 of the guides are arcuately disposed completely about upper end section 36 and correlative ends 1 through 21 are arcuately disposed completely about lower end section 37. End openings 1 through 21 lie in a clockwise direction and the ends 1' through 21' lie in a counterclockwise direction, thereby yielding the requisite transposed space phase relationship. Waveguide 1—1' extends across a diameter of formed cylindrical section 34, and splits cylinder 34 into two sections each subtending somewhat less than 180°. These appropriately semi-cylindrical sections correspond to individual sections 70, 71 shown developed in FIGURE 6. All of the waveguides 1 through 21 have both their end openings disposed about corresponding arcuate path of ends 36, 37.

Each of the individual waveguide paths 1—1', 2—2' ... 21—21' are seen to transgress the inner region of cylinder 34 between their respective end openings. By following such a series of paths the respective path lengths are minimized, thereby effecting the improved capabilities of the instant invention. Each path length extends towards the peripheral region of central section 34 in a manner to maintain equal electrical length of all paths. This affords uniform electrical transmission characteristics over a broad-band frequency. It is of particular importance to note that a substantial portion of each path is located in the inner or non-peripheral region of the central transmission section 34.

Each of the nested paths are of generally S-shape between the guide openings. The assembled structure locates such S portions in respectively parallel planes. These planes are each parallel to the 1—1' guide, which traverses a principal diameter of central section 34. The illustrated embodiment also shows the planar portion as extending generally across the central section of cylinder 34 and perpendicular to the axis of rotation. Such a structure has been found to be a practical compromise in yielding minimal path lengths for the array, while maintaining equality of electrical lengths for finite thickness guides. Other configurations are, of course, possible within the spirit and scope of my invention.

Figures 9, 10:
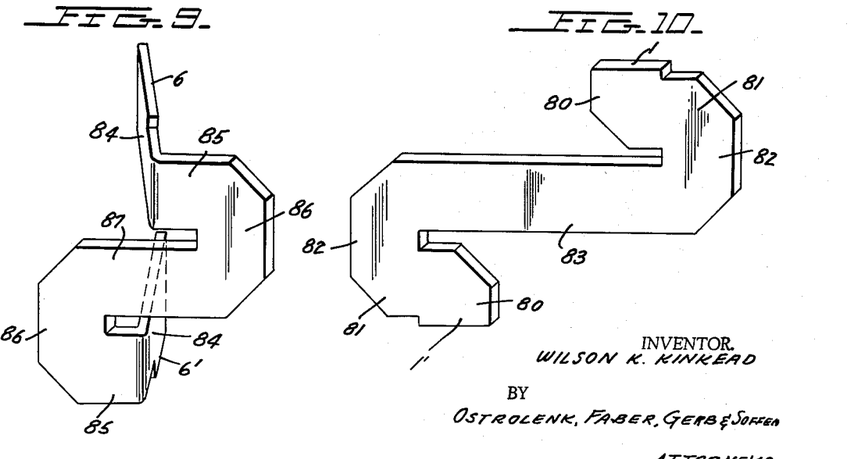
FIGURE 9 is a perspective view of one of the individual conductor paths of the central transmission section, shown in FIGURES 7 and 8.
FIGURE 10 is a perspective view of another one of the individual conductor paths of the central transmission section shown in FIGURES 7 and 8.

FIGURES 9 and 10 illustrate, in perspective, individual S-shaped waveguides 1—1' and 6—6', respectively. Referring to FIGURE 9, guide end 1 has a downwardly extending waveguide section 80 which leads to horizontal waveguide section 81 extending towards the peripheral region of cylinder 34. Section 81 connects to downwardly extending waveguide section 82 which, in turn, leads to main horizontal waveguide 83. Main horizontal waveguide section 83 of the assembled unit is located midway between ends 36 and 37 of cylinder section 34 and extends diametrically across the cylinder perpendicular to the axis of rotation of assembled section 34. Waveguide section 83 sequentially connects to repeated sections 82, 81 and 80, and terminates at end opening 1'. The bends joining the various guide sections are constructed to minimize signal reflections caused by discontinuities. Tuning posts (not shown) or similar construction, well known in the art, may be added to cancel out the effects of such discontinuation. Referring now to FIGURE 10, a somewhat different but basically analogous configuration is necessary for the 6—6' waveguide. By referring to FIGURE 8 it is seen that guide end openings 6 and 6' are to be arcuately separated by a fairly small angle in relation to ends 1—1'. In fact, the path ends of these nested waveguides are separated by progressively smaller angles, with 6—6' and 17—17' being representative of the least separation and 1—1' of the greatest separation (180°). Guide end 6 leads to peripherally extending waveguide section 84 which leads to waveguide section 85. Section 85 leads to vertical section 86 which, in turn, leads to main horizontal waveguide section 87. Main horizontal section 87 is similarly located midway between ends 36 and 37 of the assembled cylindrical unit 34 and passes through the inner region thereof. The S-shape section (85—86—87—86—85) of the assembled unit will be in a plane parallel to the principal diameter defined by guide 1—1'. Also, the path across main horizontal section 87 will be perpendicular to the axis of rotation of assembled section 34. Thus, it is seen that the individual waveguides illustrated in both FIGURES 9 and 10 direct a substantial portion of their path through the inner region of the cylindrical section, parallel to a principal diameter, and perpendicular to the axis of rotation.

Figure 11:
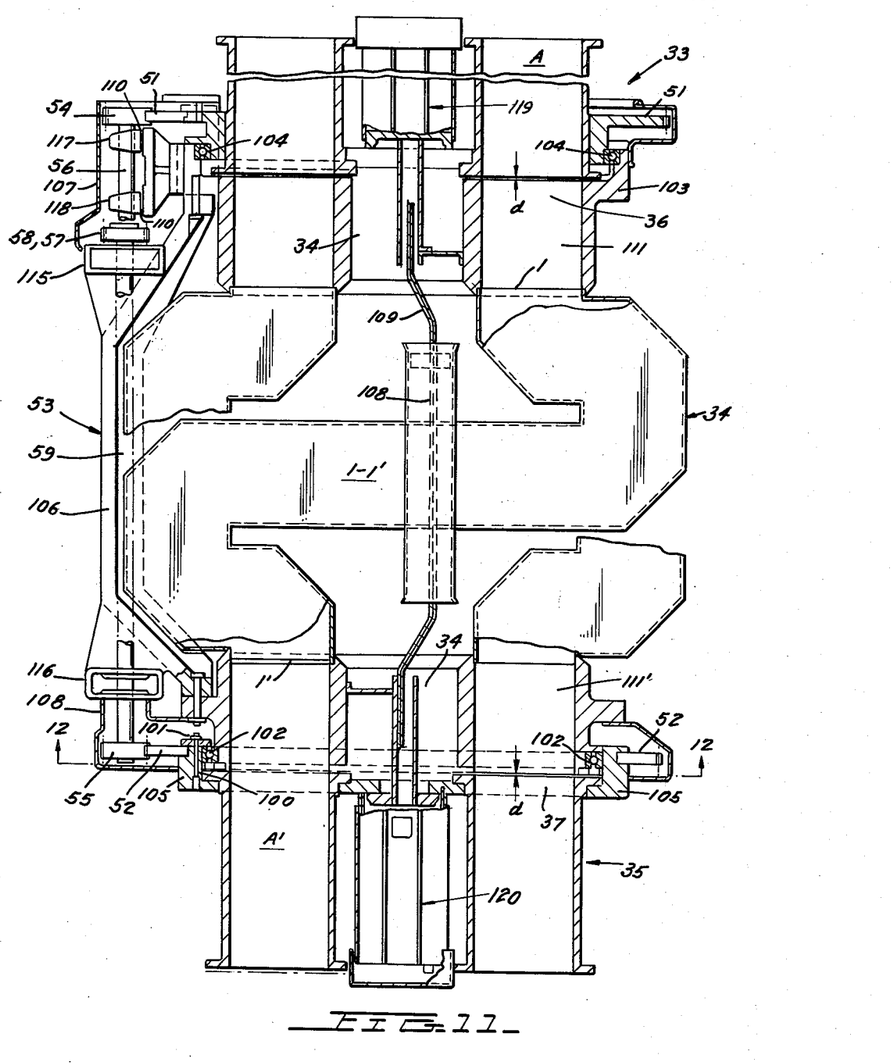
FIGURE 11 is a cross section of the assembled instant invention.

In the embodiment of FIGURE 11, it has been found convenient to modify the gearing arrangement slightly from the generalized form of FIGURE 2. Gear 52 which is fixedly attached to stationary launcher section 35 is shown in vertical alignment with end section 37 of central transmission section 34. This gear is, however, fixedly attached to end launcher sections 35 by a plurality of circumferentially located bolts 100 and nuts 101. Bearing 102 circumferentially disposed about end section 36 of central transmission section 34 permits relative rotation between central section 34 and gear 52, with the latter gear being fixedly associated with end launcher sections 35. Gear 51 is vertically aligned and unitarily associated with end launcher 33 as previously shown in FIGURE 2. Alignment of cylindrical sections 33 and 34 is maintained by housing extension 103 of central section 34 which extends beyond the end 36 of that section. Bearing 104 circumferentially disposed about end launcher sections 33 permits relative rotation between housing extension 103 and end launcher section 33. In a similar way that housing extension 103 acts to maintain alignment between sections 33 and 34, the aforementioned nut and bolt arrangement (100, 101) will serve to maintain alignment between housing extensions of sections 34 and 35.

Shaft 59 is secured to central transmission section 34 by passing through bearings 115, 116, which are secured to external housing 106 of that section. Similarly, shaft 56 is secured to housing extension 103 with bearings 117, 118. Guards 107 and 108 cover the differential gears to confine the R-F energy which could otherwise leak out of the gaps between the sections and to keep foreign matter from interfering with the gearing. Shims 110 permit adjustment of the gears 54, 57 and shaft 56 assembly to provide proper gear teeth engagement. A conduit 108 is shown extending through central transmission section 34 to provide for passage of cable 109 between slip ring assemblies 119 and 120. Such slip ring assemblies would typically be used to transmit low power signals between stationary and rotating members 33 and 35. The conduit is shown between guides 1—1' and 12—12' with other placement being possible. Also, the guides may be routed away from the innermost region to permit a wider conduit.

A plurality of coupling guides 111 extend, one from each of the openings 1, 2 ... 21 of the waveguides and a similar set 111' extend from each of the open ends 1', 2' ... 21'. These coupling elements serve as practical wave signal guides to provide a smooth transition between the ends of the waveguide passages of the central transmission section 34, and the corresponding launching horns of launcher sections 33, 35.

A small practical clearance $d$ exists between the outer coupling ends of the elements 111 and the launching section 33. Similarly a clearance $d'$ exists between the ends of the elements 111' and launching sections 35. The clearances $d$ and $d'$ permit the relative rotation required, as previously set forth, between the respective central transmission and launching sections (33, 34, 35). The regions across $d$ and $d'$ are the commutation planes between the waveguides and the corresponding launching horns. Although the launching horns are shown to be in vertical alignment, such horns may also be aligned horizontally or at an incline. Such an arrangement will yield a horizontal plane or conical areas respectively of commutation in place of the vertical cylindrical commutation area shown.

It is also understood that although this embodiment shows a differential gearing arrangement to maintain multiple channel integrity between a stationary launching section (35) and rotating launcher section (33) other gearing arrangement or a cable drive may be employed in conjunction with the sections 33—35 should other differential motion be desired.

Figure 12:
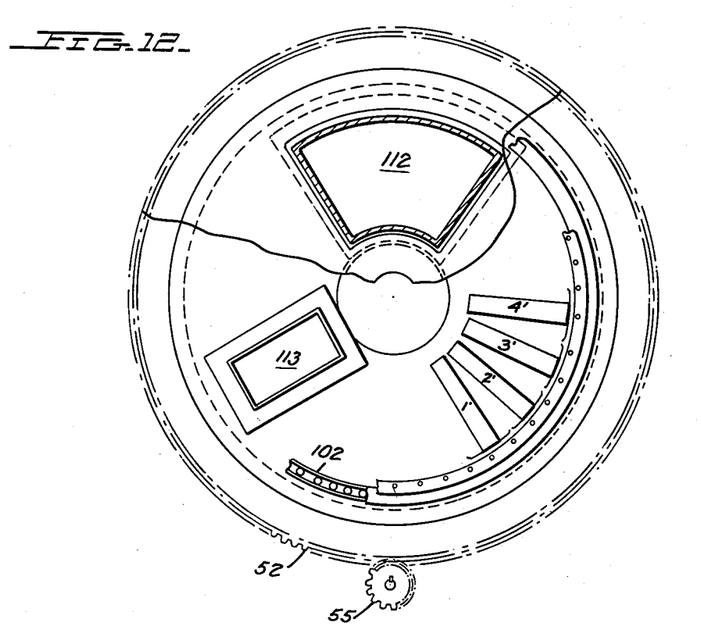
FIGURE 12 is a cross section partially in phantom along line 12 of FIGURE 11 and looking in a direction of the arrows.
Figure 13:
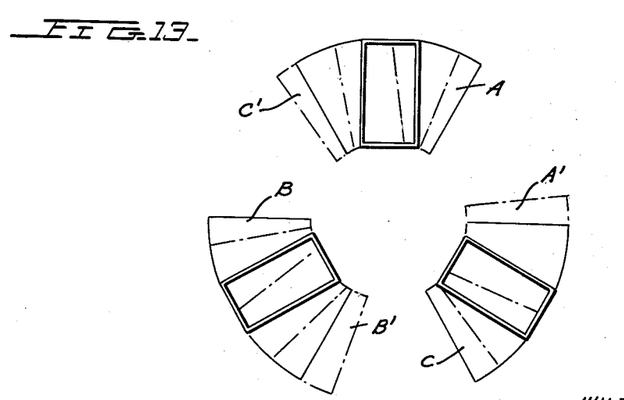
FIGURE 13 is a simplified bottom view of the rotary joint showing the horn arrangement. Horns A′, B′ and C′ are shown in phantom and the central transmission section is omitted.

FIGURE 12 shows the aligned relationship of the individual launching horns of end launcher section 35 with respect to central transmission section 34. Four wave passages, as for example 1', 2', 3', 4' are shown being in the arcuate path overlapped by the aperture or flared end 112 of the launching horns. Flared ends 112 taper to rectangular sections 113 or ports $a'$, $b'$, $c'$ (not shown). Ports $a'$, $b'$, $c'$ couple to corresponding waveguides which lead to the electrical operating equipment. FIGURE 13 shows the transposed space phase relationship between the horns at opposite ends of central section 34. The 120° circumference spacing of horns A, B, C, is also evident. Their coupling with the individual waveguides of the central section is not drawn in, for purposes of clarity, but it is clear from FIGURE 11. The transposed relationship of the individual wave paths (1—1', 2—2', ... 21—21') of central section 34 continually maintains a plurality of paths between the corresponding end launchers A—A', B—B', C—C'.

The launching sections of the individual rotary couplers may assume other practical forms than the simple horn pairs, channel-to-channel herein illustrated. For example, one may employ plurality of horn pairs per channel. The latter would increase power capability by combining the horns of a single energy channel outside of the rotary joint. Also, an idle horn may be incorporated in the end launcher sections 33, 35 between horns of different channels for channel isolation. The horn launchers may be arranged to fire longitudinally, as illustrated, or the system orientated for tilted firing, (angular and oblique); or even radial firing, including use of a phase front corrector.

Alternatively more perfectly focussed line sources may be used as launcher elements such as parabolic pill-boxes, (single or multiple layer); lensed horns; array of horns, probes, etc. These launching devices will be similarly circularly arrayed for coaction with the corresponding ends of the wave passages of the central transmission section 34. Another particularly advantageous launcher is a travelling-wave slot array type, in cylindrical form, as shown in the copending U.S. application Serial No. 60,-025, filed October 3, 1960, in the name of David F. Bowman, entitled "Concentric Rotary Coupler for Wave Signals," and assigned to the assignee of the instant invention.

The central drum wave signal transmission section have herein been illustrated and described in connection with separate-path nested waveguides. These guides, of course, may be used in an E-plane commutating mode or in combination as skew plane commutation. Further TEM lines may be used in coaxial or strip transmission line form or in combination with waveguides, as will now be evident to those skilled in the art.

Further investigation of the configuration disclosed in the above noted copending application Serial No. 56,-496, has indicated difficulties in actually achieving the expected performance specifications quoted therein. A practical embodiment of the instant invention is, however, practically realizable to operate over the band width of 850 to 950 megacycles; exhibiting a standard wave ratio of less than 1.25; wow of less than 1.15, insertion loss of less than 1.0 db; and inter-channel isolation of more than 40 db. Significant band width regions are also anticipated in which the insertion loss may be significantly decreased below 0.5 db. The central transmission section 34 of this embodiment will be approximately four and one-half feet in axial length, with the transposed waveguide paths 1—1', 2—2' ... 21—21' occupying approximately three feet. The unit diameter was approximately five feet. Thus, it is seen that the actual volume devoted to transpose the wave signals between the ends of the central transmission is approximately three feet in height with a diameter of five feet. It is of importance to note that in minimizing the path lengths, the section devoted to ransposing the signals may be materially shorter than wide.

Although I have here described preferred embodiments of my novel invention, may variations and modifications will now be apparent to those skilled in the art, and I therefore prefer to be limited not by the specific disclosure herein but only by the appending claims.

The embodiments of the invention in which an exclusive privilege or property is claimed are defined as follows:

1. A wave signal rotary coupler comprising a first and a second launching section; a central transmission section having a first end and a second end; said central transmission section providing a plurality of interlaced wave signal paths, each from one of many stations about said first end to a corresponding one of an equal number of correlative stations about said second end; said first end stations being arrayed in a first direction and said second end stations being arrayed in a second direction; said central transmission section paths being composed of nested array of individual paths each containing a generally S-shaped portion passing through the inner region of said central transmission section in respectively parallel planes parallel to a principal diameter of said last mentioned section; said launching sections individually coupling with said transmission section; and mechanism for driving said sections to effect plural channel wave signal transmission between said first and second launching sections with said sections in relative motion.

2. A wave signal rotary coupler comprising a first and a second launching section; a central transmission section having a first end and a second end; said central transmission section providing an interlaced plurality of wave signal paths, each from one of many stations about said first end to a corresponding one of an equal number of correlative stations about said second end; said first end stations being arrayed in a first direction and said second end stations being arrayed in a second direction; said central transmission section paths being composed of a nested array of individual paths, each containing a portion to conduct wave signals through the inner region of said central transmission section, and in a direction generally perpendicular to the axis of rotation of said central transmission section, said portions being disposed in respectively parallel planes; said launching sections individually coupling with said transmission section; and mechanism for driving said sections to effect plural channel wave signal transmission between said first and second launching sections with said sections in relative motion.

3. The wave signal rotary coupler of claim 2, wherein each of said central transmission section paths are of substantially equal electrical length.

4. A wave signal rotary coupler comprising a first and a second launching section; a central generally cylindrical transmission section having a first and a second end; said central transmission section providing means for conducting wave signals of a plurality of channels through its inner region in transposed space phase relationship between said ends; said means comprising interlaced wave signal paths having a portion thereof extending generally parallel to a principal diameter of said central transmission section; said launching sections individually coupling with said transmission section; and mechanism for driving said sections to effect plural channel wave transmission between said first and second launching sections with said sections in relative angular motion about their axis of rotation.

5. A wave signal rotary coupler comprising a first and a second launching section; a central generally cylindrical transmission section having a first and second generally circular end; the diameters of said first and second ends being substantially equal and significantly greater than the axis of rotaton of said central transmission section; said central transmission section providing means for conducting wave signals of a plurality of channels through its inner region in transposed space phase relationship between said ends; said means comprising interlaced wave signal paths having a portion thereof extending generally parallel to a principal diameter of said central transmission section; said launching sections individually coupling with said transmission section; and mechanism for driving said sections to effect plural channel wave transmission between said first and second launching sections with said sections in relative angular motion about said axis of rotation.

6. A wave signal rotary coupler comprising a first and a second launching section; a central generally cylindrical transmission section having a first and a second end, said central transmission section providing a plurality of substantially equal electrical length means for conducting wave signals of a plurality of channels through its inner region in transposed space phase relationship between said ends; said means comprising interlaced wave signal paths having a portion thereof extending generally parallel to a principal diameter of said central transmission section; said launching sections individually coupling with said transmission section; and mechanism for driving said sections to effect plural channel wave transmission between said first and second launching sections with said sections in relative angular motion about their axis of rotation; said plurality of means being greater than said plurality of wave signal channels.

7. A wave signal rotary coupler comprising a first and a second launching section; a central transmission section having a first end and a second end; said central transmission section providing a plurality of interlaced wave signal paths through its inner region, each from one of may stations about said first end to a corresponding one of an equal number of correlative stations about said second end, said first end stations being arrayed in a first direction and said second end stations being arrayed in a second direction, said paths being of substantially equal and minimal electrical length and including a portion extending generally parallel to a principal diameter of said central transmission section; said launching section individually coupling with said transmission section; and mechanism for differentially driving said sections to effect plural channel wave signal transmission between said first and second launching sections with said sections in relative motion.

8. A wave signal rotary coupler comprising a first and a second launching section; a central transmission section having a first end and a second end; said central transmission section providing a nested array of generally S-shaped interlaced wave signal paths, each from one of many stations about said first end to a corresponding one of an equal number of correlative stations about said second end, said first end station being arrayed in a first direction and said second end stations being arrayed in a second direction; each of said paths having a substantial portion disposed in the non-peripheral region of said central transmission section in respectively parallel planes; said launching sections individually coupling with said transmission section; and mechanism for driving said sections to effect plural channel wave signal transmission between said first and second launching sections with said sections in relative motion.

9. A wave signal rotary coupler comprising a first and a second launching section; a central generally cylindrical transmission section having a first end and a second end; said central transmission section providing a nested array of a plurality of interlaced wave signal paths each from many stations about said first end to a corresponding one of an equal number of correlative stations about said second end; said first end stations being arrayed in a clockwise direction, and said second end stations being arrayed in a counter-clockwise direction, each of said paths having a substantial portion disposed in the region of said central transmission section in respectively parallel planes; said launching sections individually coupling with said transmission section; and mechanism for differentially rotating said sections to effect plural channel wave transmission between said first and second launching sections with said sections in relative angular motion about the axis of rotation of said central transmission section.

10. A wave signal rotary coupler comprising a first and a second launching section; said launching sections each containing an equal plurality of three or more correlative individual launcher units arcuately spaced apart by substantially the same angle, said first launcher unit being arrayed in a first direction and said second launcher unit being arrayed in a second direction; a central generally cylindrical transmission section having a first end and a second end; said central transmission section providing a plurality of interlaced wave signal paths in transposed space phase relationship each from many stations about said first end to a corresponding one of an equal number of correlative active stations about said second end; each of said paths being of generally S-shape having a substantial portion disposed in the inner region of said central transmission section in respectively parallel planes; said launching sections individually coupling with said transmission section along said station arrays; and mechanism for differentially rotating said sections to effect plural channel wave transmission between said first and second launching sections with said sections in relative angular motion about the axis of rotation of said central transmission section.

11. The wave signal rotary joint of claim 8 wherein each of said wave signal paths contains a planar portion; and said planar portions are disposed in overlapped, respectively parallel planes.

12. The wave signal rotary joint of claim 9 wherein said central transmission section is angularly motivated at one-half of the rate and in the same direction as said first launching section.

13. A generally cylindrical section for conducting wave signals in an interlaced rotary coupler, comprising a plurality of adjacently arrayed wave guide pipes of substantially the same wave signal conduction characteristics in transposed space phase relationship end-to-end thereof; each of said pipes including a substantial intermediate portion passing through the inner region of the volume defined by said generally cylindrical section, said intermediate portions being disposed in adjacent parallel relationship, generally parallel to a principal diameter of said cylindrical section.

No references cited.